(12) United States Patent
Fischer et al.

(10) Patent No.: US 10,876,848 B2
(45) Date of Patent: Dec. 29, 2020

(54) METHODS AND SYSTEMS FOR GENERATING ROUTES

(71) Applicants: TomTom Telematics B.V., Amsterdam (NL); TomTom Navigation B.V., Amsterdam (NL)

(72) Inventors: Johannes Robert Fischer, Amsterdam (NL); Steffen Orlowsky, Amsterdam (NL)

(73) Assignee: TOMTOM NAVIGATION B.V., Amsterdam (NL)

( * ) Notice: Subject to any disclaimer, the term of this patent is extended or adjusted under 35 U.S.C. 154(b) by 375 days.

(21) Appl. No.: 15/753,442

(22) PCT Filed: Aug. 24, 2016

(86) PCT No.: PCT/EP2016/070014
§ 371 (c)(1),
(2) Date: Feb. 19, 2018

(87) PCT Pub. No.: WO2017/032816
PCT Pub. Date: Mar. 2, 2017

(65) Prior Publication Data
US 2020/0200551 A1 Jun. 25, 2020

(30) Foreign Application Priority Data
Aug. 24, 2015 (GB) .................. 1514986.7

(51) Int. Cl.
*G01C 21/34* (2006.01)
*G01C 21/36* (2006.01)
*G07C 5/00* (2006.01)

(52) U.S. Cl.
CPC ....... *G01C 21/3461* (2013.01); *G01C 21/343* (2013.01); *G01C 21/3484* (2013.01); *G01C 21/3667* (2013.01); *G07C 5/008* (2013.01)

(58) Field of Classification Search
CPC ............ G01C 21/3461; G01C 21/3484; G01C 21/343; G01C 21/3667; G07C 5/008
See application file for complete search history.

(56) References Cited

U.S. PATENT DOCUMENTS 5,184,303 A * 2/1993 Link .................. G01C 21/3461
340/995.19
6,362,751 B1 * 3/2002 Upparapalli ....... G01C 21/3461
340/995.19
(Continued)

FOREIGN PATENT DOCUMENTS

DE 102005029337 4/2006
DE 102012016736 5/2014
(Continued)

OTHER PUBLICATIONS

Search report of International Application No. PCT/EP2016/070014 dated Nov. 11, 2016.
(Continued)

*Primary Examiner* — Michael J Zanelli
(74) *Attorney, Agent, or Firm* — Park, Vaughan, Fleming & Dowler LLP

(57) ABSTRACT

A method is disclosed for generating a route in an area covered by an electronic map. The map comprises a plurality of segments representing navigable elements of a navigable network in the area covered by the electronic map. A selection of a profile is received, e.g. from a user, the profile including data identifying one or more segments of the electronic map. A route is generated between an origin and a destination in the electronic map using a routing process in which each of the one or more segments identified by the selected profile is penalised. Any segments in the generated route that are segments identified by the selected profile are
(Continued)

detected, and data representative of the generated route and the detected segments are output, e.g. for provision to a user.

16 Claims, 7 Drawing Sheets

(56) References Cited

U.S. PATENT DOCUMENTS

| | | | | |
|---|---|---|---|---|
| 8,014,914 | B2* | 9/2011 | Boss | G06Q 30/018 |
| | | | | 701/112 |
| 8,949,028 | B1* | 2/2015 | Klampfl | G01C 21/3423 |
| | | | | 701/527 |
| 2007/0225900 | A1* | 9/2007 | Kropp | G01C 21/3697 |
| | | | | 701/418 |
| 2010/0036599 | A1* | 2/2010 | Froeberg | G01C 21/3461 |
| | | | | 701/532 |
| 2011/0137551 | A1* | 6/2011 | Peri | G01C 21/3453 |
| | | | | 701/533 |
| 2012/0226391 | A1 | 9/2012 | Fryer et al. | |
| 2013/0339266 | A1 | 12/2013 | Looman et al. | |
| 2014/0222330 | A1* | 8/2014 | Kohlenberg | G01C 21/3484 |
| | | | | 701/425 |
| 2015/0228129 | A1 | 8/2015 | Cox et al. | |
| 2016/0320200 | A1* | 11/2016 | Delling | G01C 21/3605 |

FOREIGN PATENT DOCUMENTS

| | | |
|---|---|---|
| WO | 2010081540 | 7/2010 |
| WO | 2012173798 | 12/2012 |
| WO | 2015032975 | 3/2015 |

OTHER PUBLICATIONS

Search report of UK Application No. 1514987.6 dated Feb. 8, 2016.

* cited by examiner

METHODS AND SYSTEMS FOR GENERATING ROUTES

CROSS-REFERENCE TO RELATED APPLICATIONS

The present application is a National Stage of International Application No. PCT/EP2016/070014, filed on Aug. 24, 2016, and designating the United States, which claims benefit to United Kingdom Patent Application 1514986.7 filed on Aug. 24, 2015. The entire content of these applications is incorporated herein by reference.

FIELD OF THE INVENTION

This invention relates to methods and systems for generating routes, and also extends to navigation devices and servers arranged to generate routes. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning functionality, and preferably also navigation functionality. Further aspects of the invention relate to the generation of routes in general.

BACKGROUND TO THE INVENTION

Portable navigation devices (PNDs) that include GPS (Global Positioning System) signal reception and processing functionality are well known, and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Navigation devices also typically have access to a digital map representative of a navigable network on which the vehicle is travelling. The digital map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of 3 lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc.

Devices of this type will also often include one or more physical connector interfaces by means of which power, and optionally data signals, can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations.

Typically, the PND is enabled by software for searching for a "best" or "optimum" route between the start and destination address locations from the map data. A "best" or "optimum" route is determined on the basis of predetermined criteria and need not necessarily be the fastest or shortest route. The searching for a route along which to guide the driver can be very sophisticated, and the search may take into account historical, existing and/or predicted traffic and road information.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, an on-line route planning and navigation facility is provided at routes.tomtom.com, which facility allows a user to enter a start point and a destination, whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide, the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of the current road and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

Although the route calculation and navigation functions are fundamental to the overall utility of PNDs, it is possible to use the device purely for information display, or "freedriving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above provide a reliable means for enabling users to navigate from one position to another.

It is also known to use such devices to provide vehicle specific route planning and/or navigation to a user. For example, a user may indicate that they are in a vehicle of a certain type and of certain dimensions, and this information is then used to provide navigation tailored to the indicated vehicle. One known method is to plan a route in a normal fashion, e.g. without using the vehicle information, and then the user is warned of any portions of the route that conflict with the indicated vehicle. Such an approach, however, often means the user is guided along a route that is totally unsuited to their vehicle. Another known method is to plan a route that only traverses portions of the road network that do not conflict with the indicated vehicle. Such an approach, however, can lead to the user not being able to find a suitable route; a problem usually overcome by relaxing the vehicle specific information, e.g. changing the vehicle type to a less restrictive type (truck to van for example) or ignoring vehicle dimensions, until a route is found.

It is desired to provide an improved method and system for generating a route in an area covered by an electronic map based on a received selection of a profile.

SUMMARY OF THE INVENTION

In accordance with a first aspect of the invention there is provided a method of generating a route in an area covered by an electronic map, the map comprising a plurality of segments representing navigable elements of a navigable network in the area covered by the electronic map, the method comprising:

receiving a selection of a profile, said profile comprising data identifying one or more segments of the electronic map;

generating a route between an origin and a destination in the electronic map using a routing process in which each of the one or more segments identified by the selected profile is penalised;

detecting any segments in the generated route that are segments identified by the selected profile; and outputting data representative of said generated route and said detected segments.

In accordance with the invention, therefore, a selection of a profile is received that contains data identifying one or more segments of the electronic map. As will be discussed in more detail below, the profile can be a vehicle profile associated with a vehicle type, and the identified segment(s) represent navigable elements that should not be traversed by a vehicle of the vehicle type associated with the vehicle profile, e.g. due to physical restrictions, such as a vehicle length, width, height, axle weight, etc, or due to legal restrictions, such as the vehicle carrying certain hazardous material, vehicle type, overall vehicle weight, etc. It will be appreciated, however, that the profile could be any type of profile as desired provided it allows one or more segments to be identified. For example, the profile could be a user profile identifying segments representative of navigable elements which the user has identified as being undesirable to traverse.

A route between an origin and destination in the electronic map is generated using a route planning algorithm that applies a penalty to those one or more segments that are identified in the profile. The penalisation of the identified segment(s), in contrast to blocking the segments, means that a generated route can include one or more of the identified segments. However, due to the penalisation, such segments are less favourable in route generation. In other words, where a route can be generated between the origin and destination that avoids any of the identified segments, then typically this route will be the generated minimum cost route (except, for example, if it causes an unacceptable increase in journey time or distance). However, when a route can't be generated between the origin and destination without including one or more of the identified segments, then a route can still be generated, but one including one or more identified segments (albeit typically as few of the identified segments as possible).

After a route is generated, the route is analysed to determine if it includes any segments that are identified by the profile, and the route is output together with data identity any included segments, e.g. for display on a navigation device.

It will therefore be appreciated, the present invention allows a route to be generated that avoids segments identified in a profile essentially unless necessary, but also allows a user to see if a generated route includes any identified segments, such that they can decide themselves whether they wish to travel the generated route or not.

The present invention extends to a system for carrying out a method in accordance with any of the aspects or embodiments of the invention herein described.

Thus, in accordance with a second aspect of the invention there is provided a system for generating a route in an area covered by an electronic map, the map comprising a plurality of segments representing navigable elements of a navigable network in the area covered by the electronic map, the system comprising:

means for receiving a selection of a profile, said profile comprising data identifying one or more segments of the electronic map;

means for generating a route between an origin and a destination in the electronic map using a routing process in which each of the one or more segments identified by the selected profile is penalised;

means for detecting any segments in the generated route that are segments identified by the selected profile; and means for outputting data representative of said generated route and said detected segments.

As will be appreciated by those skilled in the art, this further aspect of the present invention can and preferably does include any one or more of the preferred and optional features of the invention described herein in respect of the other aspects of the invention, as appropriate. If not explicitly stated, the system of the present invention herein may comprise means for carrying out any step described in relation to the method of the invention in any of its aspects or embodiments, and vice versa.

The present invention is a computer implemented invention, and any of the steps described in relation to the system may be a set of one or more processors. The one or more processors preferably perform a method according to a set of computer readable instructions stored in a memory, or other non-transitory computer readable medium.

In general, the system of the present invention in any of its embodiments may be at least one processing device. The or a processing device may be a device of a mobile device, such as a navigation device, whether a portable navigation device (PND) or an integrated device, or may be a device of a server.

The method of the present invention is preferably implemented in the context of a navigation operation. Thus, the method is preferably carried out by a set of one or more processors of a device or system having navigation functionality. However, it will be appreciated that the methods may also be carried out by any suitable system having route generating capability, but not necessarily navigation functionality. For example, the methods may be implemented by a computer system, e.g. a desktop or laptop system, which does not have navigation functionality.

In preferred embodiments the method of the present invention in any of its aspects or embodiments is carried out using a navigation device, and the present invention extends to a navigation device arranged to carry out the steps of the method of any of the aspects or embodiments of the invention. The navigation device may be a portable navigation device (PND) or an integrated, e.g. in-vehicle, device.

Regardless of its implementation, a device, e.g. navigation apparatus, used in accordance with the present invention in any of its aspects or embodiments may comprise a processor, memory, and digital map data (or electronic map) stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include global navigation satellite system (GNSS), e.g. GPS or GLONASS, signal reception and processing functionality. As will be appreciated the navigation apparatus may use other means for determining its current location as desired, e.g. terrestrial beacons, the mobile telecommunications network, etc. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus. The apparatus may therefore comprise a display, a set of one or more processors configured to access digital map data and cause an electronic map, together with a representation of the generated route identifying any portions of the route that relate to segments identified in the selected profile, to be displayed to a user via the display, and a user interface operable by a user to enable the user to interact with the device, e.g. to select the profile.

In other embodiments the method of the present invention in any of its aspects or embodiments may be carried out by a server, and the present invention extends to a server arranged to carry out the steps of the method of any of the aspects or embodiments of the invention. The system of the present invention of any of its aspects or embodiments may be a system e.g. processing device of a server.

Of course, the steps of the method of the present invention in any of its aspects or embodiments may be carried out in part by a server and in part by a navigation apparatus. For example route generation may be carried out by a server, e.g. at the request of a navigation device, and provided to the device for output to a user. The steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication. Thus, the system of the present invention may be provided in part by a navigation device or other mobile device, and in part by a server.

The term "segment" as used herein takes its usual meaning in the art. A segment may be a navigable element (or link) that connects two nodes, or any portion thereof. While embodiments of the present invention are described with reference to road segments, it should be realised that the invention may also be applicable to other navigable segments, such as segments of a path, river, canal, cycle path, tow path, railway line, or the like. For ease of reference these are commonly referred to as a road segment, but any reference to a "road segment" may be replaced by a reference to a "navigable segment" or any specific type or types of such segments. The nodes of the navigable network as represented by the electronic map data include nodes representative of nodes connecting segments of the navigable network in the real world, e.g. junctions, intersections, etc. The nodes represented by the electronic map data may also include artificial nodes, which are not representative of nodes in the real world. For example, an artificial node may be added when a speed limit changes along a navigable element.

The method comprises the step of receiving a selection of a profile. The profile is preferably a vehicle profile that is associated with a vehicle type. For example, the selected profile may identify that the vehicle is one or more of: a car; a van; a bus; and a truck. The profile may also comprise one or more of: dimensions of the vehicle, e.g. length, width, height; weight of the vehicle, e.g. overall (or gross) weight, axle weight; maximum speed; and information identifying any hazardous materials the vehicle may be carrying, e.g. explosive materials, etc. The information contained in this profile is used to identify one or more segments of the vehicle map. For example, in the case of a vehicle profile, the information in the profile identifies segments representative of navigable elements that should not be traversed by a vehicle that matches the vehicle profile, e.g. for physical or legal reasons. Some segments of the electronic map may, for example, represent navigable elements that can't be traversed by a vehicle of more than certain dimensions and/or weight, e.g. due to the width of the road, the presence of low bridges, sharp bends, steep inclines, etc. Other segments may, for example, represent navigable elements that legally can't be used by vehicles of a certain type or can't be used by vehicles carrying certain hazardous loads, e.g. because they are too close to civilian population centres.

The method comprises generating a route between an origin and destination in the electronic map using a routing process, e.g. a route planning algorithm. The origin and destination may be obtained from any suitable source or sources. The origin and destination may be user specified or automatically selected, or combinations thereof. For example, the origin and/or destination may be received over a communications network. The origin and destination could be received by a server from a navigation device, or may be received by a navigation device from a server. The origin may, for example, correspond to a current position of a device, e.g. in a vehicle. The destination may, for example, correspond to a location input by the user.

In the present invention the routing process involves penalising each of the one or more segments identified by the selected profile. The route is preferably generated based upon a cost of traversing segments of the electronic map. The cost of traversing a segment may be determined using a cost function. The cost of traversing a segment may be determined based upon one or more attributes associated with the segment. The cost of traversing a segment is preferably based at least in part upon a time to traverse the segment. Obtaining routes by reference to a traversal cost may be achieved using any known method, such one based on the Dijkstra method. Preferably the route between the origin and destination is a least cost route between the origin and the destination. The least cost route may be a fastest route, shortest route, most ecological etc, or any combination thereof as desired. A least cost route may be based upon minimising a cost associated with traversing segments of the electronic map, which cost is determined using an appropriate cost function, i.e. which results in a lower cost being associated with segments that have an attribute that is deemed particularly desirable, or a higher cost associated with segments that are deemed undesirable. For example, the cost function may be selected as appropriate, e.g. based upon user input, to result in a least cost route that is a shortest route, fastest route, most ecological route, etc.

In embodiments, the routing process comprises using a route planning algorithm that assigns a cost for traversing segments of the electronic map and explores routes between the origin and the destination comprising a plurality of segments to identify a minimum cost route, said generated route being the identified minimum cost route, and wherein each of the one or more segments identified by the selected profile is penalised through the application of a cost penalty, such that the one or more identified segments will be less favourable for inclusion in the generated route. The cost of traversing a segment is determined using a cost function, and preferably based at least in part upon one or more attributes associated with the segment (also referred to herein as "attribute data"). For example, the cost for traversing a segment can be based at least in part on an expected time to traverse a segment based on a stored expected traversal speed for the segment and a length of the segment. The cost function may be selected as appropriate, e.g. based upon user input, to result in a least cost route that is a shortest route, fastest route, most ecological route, etc.

In some embodiments, the attribute data may comprise different sets of attributes and/or different attribute values for different vehicle types. For example, the expected speed to traverse a segment may be different for a car, than it is for a truck. Thus, in embodiments where the selected profile is a vehicle profile identifying a vehicle type, the cost for traversing a segment is preferably based in part upon one or more attributes associated with the segment that are relevant for the vehicle type of the selected vehicle profile. The use of such vehicle-specific attributes also allows the estimated travel time for the generated route to be appropriate for the vehicle specified in the selected vehicle profile.

In generating the route between the origin and the destination, each of the one or more segments identified by the selected profile is penalised through the application of a cost penalty, such that the identified segments will be less favourable for inclusion in the generated route. In embodiments, the cost penalty may be applied to the or each identified segment using the cost function. For example, the method may comprise determining a cost associated with traversing segments using a cost function that is arranged to apply a cost penalty to the or each identified segment (e.g. only to the or each identified segment) as a result of their being identified by the selected profile. Thus, in embodiments, the cost of traversing the or each identified segment may comprise a first component based upon one or more attributes of the segment, and a second component comprising the applied cost penalty. In other embodiments, it is envisaged that the or each identified segment could be penalised in accordance with the invention by modifying the attribute data associated with the or each segment, so that the or each segment will be less favourable for inclusion in a route. Thus, rather than directly applying a cost penalty to the or each identified navigable segment using an appropriate cost function, a cost penalty for traversing a navigable segment may be applied indirectly through modifying the attribute data for the segment.

In embodiments, the method of generating a route by penalising segments identified in a selected profile occurs after the failure to generate a route by blocking segments identified in the selected profile. In other words, the route generation by penalising is performed as a fallback when route generation by blocking is unable to find a suitable route between an origin and a destination. As will be appreciated, "blocking" in the context of route generation means that segments identified as blocked are not explored and can't be included in a route. "Blocking" can thus be thought of as a hard restriction, while "penalising" can be thought of as a soft restriction.

Accordingly, in embodiments, and after receiving selection of a profile, the method may comprise using a first routing process to try and generate a first route between the origin and the destination in which each of the one or more segments identified by the selected profile is blocked. Preferably, the first routing process comprises using a first route planning algorithm that assigns a cost for traversing segments of the electronic map and explores routes between the origin and the destination comprising a plurality of segments to identify a minimum cost route, said first route being the identified minimum cost route, and wherein each of the one or more segments identified by the selected profile is blocked, such that the one or more identified segments will not be explored by the first route planning algorithm. Accordingly, in such embodiments, the first generated route will never include any of the segments identified in the profile.

In the event that a first route can't be found between the origin and the destination, the method comprises generating a second route between the origin and the destination using a second routing process in accordance with the invention, e.g. a second route planning algorithm in which each of the one or more segments identified by the selected profile is penalised through the application of a cost penalty.

In embodiments, and after the failure of the first route planning algorithm to generate a first route, the generation of the second route occurs after an input from the user, e.g. confirming that they are happy to be guided along a route that includes one or more of the 'restricted' segments identified by the selected profile. In other words, it has been realised that a route which includes some restricted segments is better than presenting the no route to a user.

In some embodiments, the profile can comprise data identifying a first set of one or more segments of the electronic map (referred to herein as "first segments") and a second set of one or more segments of the electronic map (referred to herein as "second segments"). The first segments can be segments representative of navigable elements that a user would ideally not use, e.g. due to legal restrictions or even simply personal preference, while the second segments can be segments representative of navigable elements that the user is not able to use, e.g. due to physical restrictions. For example, the first segments can be segments identified as being restricted for traversal based on legal restrictions, such as vehicle type, gross weight and a load including hazardous materials. The second segments can, for example, be segments identified as being restricted for traversal based on physical restrictions, such as vehicle length, width, height and axle weight.

In embodiments, and after receiving selection of a profile comprising data identifying a set of one or more first segments of the electronic map and a set of one or more second segments of the electronic map, the method may comprise using a first routing process to try and generate a first route between the origin and the destination in which each of the one or more first and second segments identified by the selected profile is blocked, e.g. using a first route planning algorithm that assigns a cost for traversing segments of the electronic map and explores routes between the origin and the destination comprising a plurality of segments to identify a minimum cost route, said first route being the identified minimum cost route, and wherein each of the one or more first and second segments identified by the selected profile is blocked. In the event that a first route can't be found between the origin and the destination, the method comprises using a second routing process to try and generate a second route between the origin and the destination in which each of the one or more second segments identified by the selected profile is blocked and each of the one or more first segments identified by the selected profile is penalised, e.g. using a second route planning algorithm that assigns a cost for traversing segments of the electronic map and explores routes between the origin and the destination comprising a plurality of segments to identify a minimum cost route, said second route being the identified minimum cost route, and wherein each of the one or more second segments identified by the selected profile is blocked and each of the one or more first segments identified by the selected profile is penalised through the application of a cost penalty. In the event that a second route can't be found between the origin and the destination, the method comprises using a third routing process to try and generate a third route between the origin and the destination in which each of the one or more first and second segments identified by the selected profile is penalised, e.g. using a third route planning algorithm that assigns a cost for traversing segments of the electronic map and explores routes between the origin and the destination comprising a plurality of segments to identify a minimum cost route, said third route being the identified minimum cost route, and wherein each of the one or more first and second segments identified by the selected profile is penalised through the application of a cost penalty.

In these embodiments, the cost penalty applied to the first segments may be different from the cost penalty applied to the second segments, such that the one or more first segments will be more favourable for inclusion in the generated route than the one or more second segments. In other words, the route will be more likely to include a first segment relative to a second segment.

It will be appreciated that profile could comprise data identifying more than two sets of one or more segments, and wherein the route planning algorithms block and/or penalise different sets of segment as appropriate in order to generate a route.

According to the present invention, once a route has been generated between the origin and the destination, the route is analysed to detect if the route includes any segments identified by the selected profile. Data representative of the generated route and said detected segments is then output, e.g. for provision to user in any suitable manner, such as visually, audibly, etc.

The method may comprise displaying at least a portion of the route to the user. For example, an overview of the route may be provided, indicative of the entire route between the origin and destination, or at least a portion thereof. The method may further comprise generating, and, in embodiments, providing navigation instructions to a user to guide the user along the route. Navigation instructions as referred to herein may be in the form of a display of the route, typically in combination with a set of one or more instructions indicative of manoeuvres and other actions to be taken by the user to follow the route, which may be given audibly and/or visually.

The data representative of the detected segments can include a segment identifier, together with data indicating the reason the segment was identified in the profile. For example, the segment could representative of a forbidden road for a certain vehicle type, or it could represent a navigable element having a low bridge, a steep incline, etc, or that is too narrow. The data representative of the detected segments can be used, for example, to display the detected segments of the route in a different manner, e.g. colour, width, style (dotted, solid, etc), etc, than the reminder of the displayed route or portion thereof.

In embodiments, and as a user travels along the generated route, a warning can be output to the user when the current position of the device, and thus the user, is within a predetermined distance and/or travel time of the segment, preferably the start of the segment. The warning can be provided visually, e.g. as a graphical icon, a text message or the like, audibly and/or haptically. The warning can include information identifying the type of restricted that is being approached, e.g. low bridge, steep incline, sharp curve, etc.

The method may comprise displaying a schematic representation of the route together with an indication of the position of one or more detected segments along the route. In some embodiments the schematic representation of the route is a linear representation. The representation of the route may be a representation of any portion of the route including a current position and a detected segment, e.g. the nearest segment. The representation may of a form as described in US 2007/0225902 A1 entitled "Navigation device displaying dynamic travel information" or WO 2008/083862 A1 entitled "Method of indicating traffic delays, computer program and navigation system therefor", the entire content of both documents being incorporated herein by reference, wherein the schematic representation is a linear representation extending from the origin of a planned route, or the current position of a navigation device along the planned route, to the destination of the planned route. In preferred embodiments, however, the representation may be of a form as described in WO 2014/060559 A1 entitled "Methods and systems of providing information using a navigation apparatus", the entire content of which is also incorporated herein by reference, wherein the schematic representation is a linear representation of a portion of a path to be followed. As will be appreciated, the schematic representation is not intended to provide an accurate path representation for use in navigation, but is to be used to facilitate visualization of the path to be travelled and to convey information relating to POI or events, e.g. traffic, accidents, hazards, speed cameras, danger zones, etc, or in this case warnings concerning restricted segments, relating to the path, e.g. by appropriately annotating the representation. In embodiments the method further comprises displaying a representation of a 2D or 3D navigation map simultaneously with displaying the linear representation of the portion of the path. The navigation map may provide a representation of a current position and an indication of a road on which the current position is located. The navigation map may provide an indication of the path to be taken from the current position to follow the route. The navigation map provides a representation of the actual surroundings to facilitate navigation. The displayed linear representation of the portion of the path and/or display window in which the representation is displayed may be located along a side of the displayed navigation map. The side may be a bottom or top edge or more preferably one of the side edges connecting the top and bottom edges of the map. In some embodiments the linear representation extends vertically along a side of the map. In some preferred embodiments the linear representation and/or window is provided superimposed on a background image of the 2D or 3D navigation map.

Any of the methods in accordance with the present invention may be implemented at least partially using software, e.g. computer programs. The present invention thus also extends to a computer program comprising computer readable instructions executable to perform, or to cause a navigation device and/or server to perform, a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Regardless of its implementation, a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include navigation satellite, e.g. GPS (Global Positioning System) or GLONASS, signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented at least in part by means of an application of a processing device which does not form part of a specific navigation device. For example the invention may be implemented using a suitable computer system arranged to execute navigation software. The system may be a mobile or portable computer system, e.g. a mobile telephone or laptop, or may be a desktop system.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

It should be noted that the phrase "associated therewith" in relation to one or more segments should not be interpreted to require any particular restriction on data storage locations. The phrase only requires that the features are identifiably related to a segment. Therefore association may for example be achieved by means of a reference to a side file, potentially located in a remote server.

Advantages of these embodiments are set out hereafter, and further details and features of each of these embodiments are defined in the accompanying dependent claims and elsewhere in the following detailed description.

BRIEF DESCRIPTION OF THE FIGURES

Embodiments of the invention will now be described, by way of example only, with reference to the accompanying figures, in which.

DETAILED DESCRIPTION OF THE FIGURES

Embodiments of the present invention will now be described with particular reference to a Portable Navigation Device (PND). It should be remembered, however, that the teachings of the present invention are not limited to PNDs but are instead universally applicable to any type of processing device that is configured to execute navigation software in a portable manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

Further, embodiments of the present invention are described with reference to road segments. It should be realised that the invention may also be applicable to other navigable segments, such as segments of a path, river, canal, cycle path, tow path, railway line, or the like. For ease of reference these are commonly referred to as a road segment.

It will also be apparent from the following that the teachings of the present invention even have utility in circumstances, where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
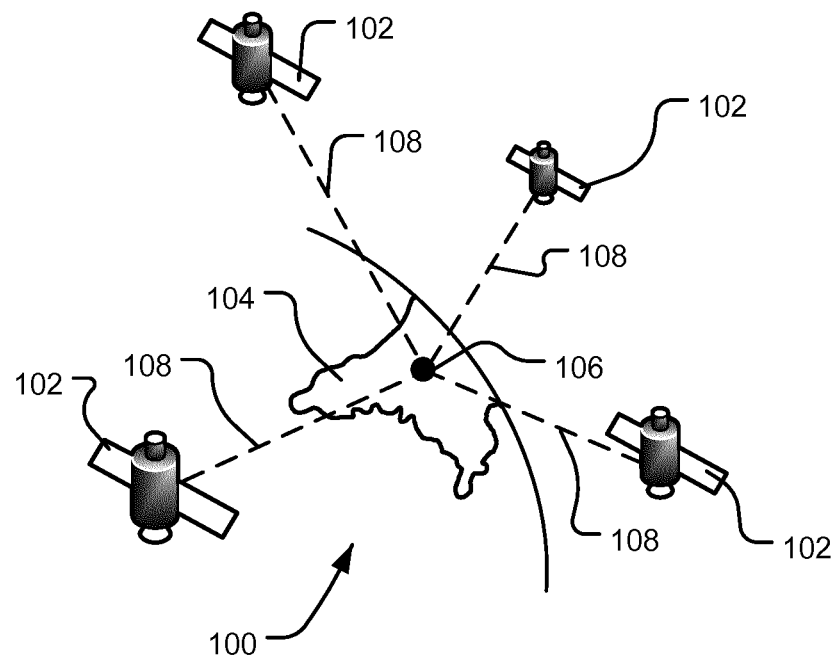
FIG. 1 is a schematic illustration of an exemplary part of a Global Positioning System (GPS) usable by a navigation device.

With the above provisos in mind, the Global Positioning System (GPS) of FIG. 1 and the like are used for a variety of purposes. In general, the GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location, as GPS data, to any number of receiving units. However, it will be understood that Global Positioning systems could be used, such as GLOSNASS, the European Galileo positioning system, COMPASS positioning system or IRNSS (Indian Regional Navigational Satellite System).

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal allows the receiving device to calculate its three dimensional position by the same geometrical calculation in a known manner. The position and velocity data can be updated in real time on a continuous basis by an unlimited number of users.

As shown in FIG. 1, the GPS system 100 comprises a plurality of satellites 102 orbiting about the earth 104. A GPS receiver 106 receives GPS data as spread spectrum GPS satellite data signals 108 from a number of the plurality of satellites 102. The spread spectrum data signals 108 are continuously transmitted from each satellite 102, the spread spectrum data signals 108 transmitted each comprise a data stream including information identifying a particular satellite 102 from which the data stream originates. The GPS receiver 106 generally requires spread spectrum data signals 108 from at least three satellites 102 in order to be able to calculate a two-dimensional position. Receipt of a fourth spread spectrum data signal enables the GPS receiver 106 to calculate, using a known technique, a three-dimensional position.

Figure 2:
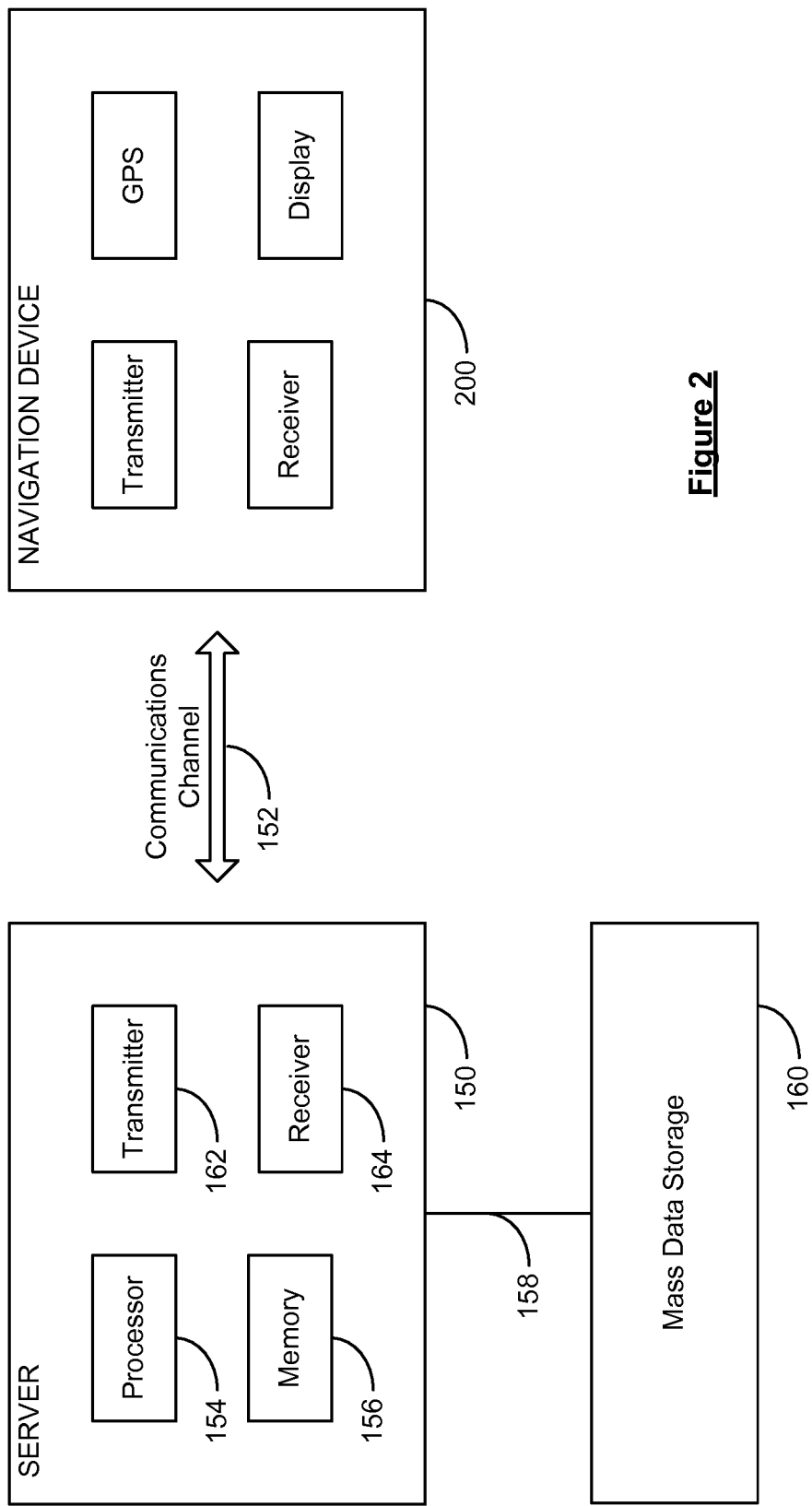
FIG. 2 is a schematic diagram of a communications system for communication between a navigation device and a server.

Turning to FIG. 2, a navigation device 200 (i.e. a PND) comprising or coupled to the GPS receiver device 106, is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 150. As such, a "mobile" network connection can be established between the navigation device 200 (which can be, and often times is, mobile as it travels alone and/or in a vehicle) and the server 150 to provide a "real-time" or at least very "up to date" gateway for information.

The establishing of the network connection between the mobile device (via a service provider) and another device such as the server 150, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11 a/b/c/g/n, etc.

Hence, it can be seen that the Internet connection may be utilised, which can be achieved via data connection, via a mobile phone or mobile phone technology within the navigation device 200 for example.

Although not shown, the navigation device 200 may, of course, include its own mobile telephone technology within the navigation device 200 itself (including an antenna for example, or optionally using the internal antenna of the navigation device 200). The mobile phone technology within the navigation device 200 can include internal components, and/or can include an insertable card (e.g. Subscriber Identity Module (SIM) card), complete with necessary mobile phone technology and/or an antenna for example. As such, mobile phone technology within the navigation device 200 can similarly establish a network connection between the navigation device 200 and the server 150, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 200 for example. The data stored for this information can be updated.

In FIG. 2, the navigation device 200 is depicted as being in communication with the server 150 via a generic communications channel 152 that can be implemented by any of a number of different arrangements. The communication channel 152 generically represents the propagating medium or path that connects the navigation device 200 and the server 150. The server 150 and the navigation device 200 can communicate when a connection via the communications channel 152 is established between the server 150 and the navigation device 200 (noting that such a connection can be a data connection via mobile device, a direct connection via personal computer via the Internet, etc.).

The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications, etc. As such, the communication channel 152 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), General Packet Radio Service (GPRS), etc. Both digital and analogue signals can be transmitted through the communication channel 152. These signals may be modulated, encrypted and/or compressed signals as may be desirable for the communication technology.

The server 150 includes, in addition to other components which may not be illustrated, a processor 154 operatively connected to a memory 156 and further operatively connected, via a wired or wireless connection 158, to a mass data storage device 160. The mass storage device 160 contains a store of navigation data and map information, and can again be a separate device from the server 150 or can be incorporated into the server 150. The processor 154 is further operatively connected to transmitter 162 and receiver 164, to transmit and receive information to and from navigation device 200 via communications channel 152. The signals sent and received may include data, communication, and/or other propagated signals. The transmitter 162 and receiver 164 may be selected or designed according to the communications requirement and communication technology used in the communication design for the navigation system 200. Further, it should be noted that the functions of transmitter 162 and receiver 164 may be combined into a single transceiver.

As mentioned above, the navigation device 200 can be arranged to communicate with the server 150 through communications channel 152, using transmitter 166 and receiver 168 to send and receive signals and/or data through the communications channel 152, noting that these devices can further be used to communicate with devices other than server 150. Further, the transmitter 166 and receiver 168 are selected or designed according to communication requirements and communication technology used in the communication design for the navigation device 200 and the functions of the transmitter 166 and receiver 168 may be combined into a single transceiver as described above in relation to FIG. 2. Of course, the navigation device 200 comprises other hardware and/or functional parts, which will be described later herein in further detail.

Software stored in server memory 156 provides instructions for the processor 154 and allows the server 150 to provide services to the navigation device 200. One service provided by the server 150 involves processing requests from the navigation device 200 and transmitting navigation data from the mass data storage 160 to the navigation device 200. Another service that can be provided by the server 150 includes processing the navigation data using various algorithms for a desired application and sending the results of these calculations to the navigation device 200.

The server 150 constitutes a remote source of data accessible by the navigation device 200 via a wireless channel. The server 150 may include a network server located on a local area network (LAN), wide area network (WAN), virtual private network (VPN), etc.

The server 150 may include a personal computer such as a desktop or laptop computer, and the communication channel 152 may be a cable connected between the personal computer and the navigation device 200. Alternatively, a personal computer may be connected between the navigation device 200 and the server 150 to establish an Internet connection between the server 150 and the navigation device 200.

The navigation device 200 may be provided with information from the server 150 via information downloads which may be updated automatically, from time to time, or upon a user connecting the navigation device 200 to the server 150 and/or may be more dynamic upon a more constant or frequent connection being made between the server 150 and navigation device 200 via a wireless mobile connection device and TCP/IP connection for example. For many dynamic calculations, the processor 154 in the server 150 may be used to handle the bulk of processing needs, however, a processor (not shown in FIG. 2) of the navigation device 200 can also handle much processing and calculation, oftentimes independent of a connection to a server 150.

Figure 3:
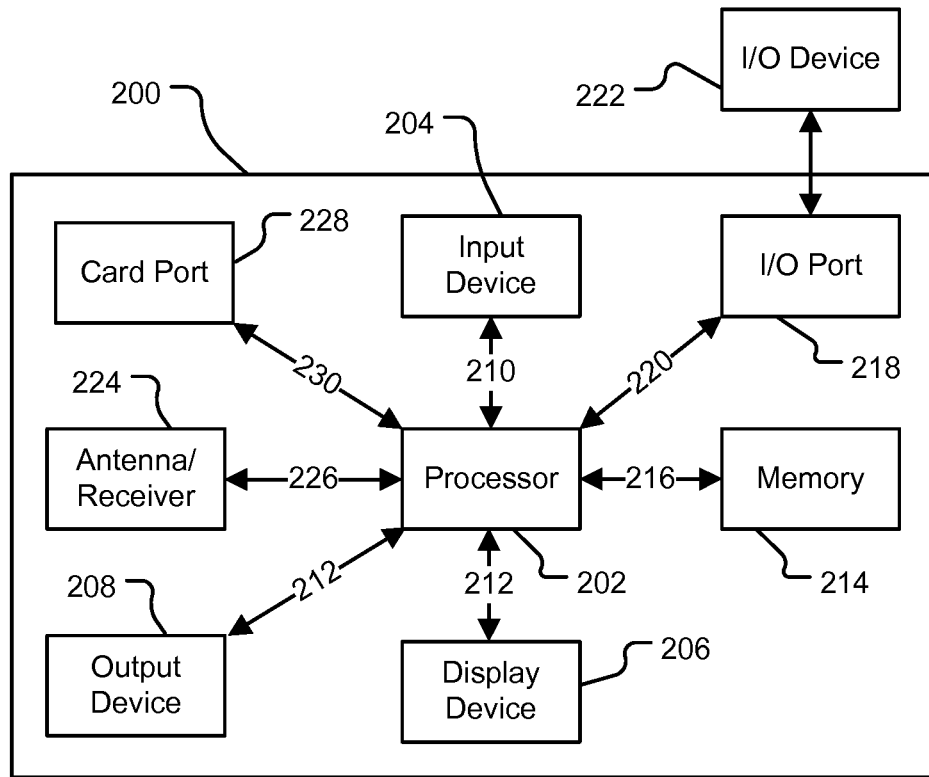
FIG. 3 is a schematic illustration of electronic components of the navigation device of FIG. 2 or any other suitable navigation device.

Referring to FIG. 3, it should be noted that the block diagram of the navigation device 200 is not inclusive of all components of the navigation device, but is only representative of many example components. The navigation device 200 is located within a housing (not shown). The navigation device 200 includes processing circuitry comprising, for example, the processor 202 mentioned above, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, one aspect of the input device 204, the touch panel, and the display screen 206 are integrated so as to provide an integrated input and display device, including a touchpad or touchscreen input 250 (FIG. 4) to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

The memory 214 of the navigation device 200 comprises a portion of non-volatile memory (for example to store program code) and a portion of volatile memory (for example to store data as the program code is executed). The navigation device also comprises a port 228, which communicates with the processor 202 via connection 230, to allow a removable memory card (commonly referred to as a card) to be added to the device 200. In the embodiment being described the port is arranged to allow an SD (Secure Digital) card to be added. In other embodiments, the port may allow other formats of memory to be connected (such as Compact Flash (CF) cards, Memory Sticks, xD memory cards, USB (Universal Serial Bus) Flash drives, MMC (MultiMedia) cards, SmartMedia cards, Microdrives, or the like).

FIG. 3 further illustrates an operative connection between the processor 202 and an antenna/receiver 224 via connection 226, wherein the antenna/receiver 224 can be a GPS antenna/receiver for example and as such would function as the GPS receiver 106 of FIG. 1. It should be understood that the antenna and receiver designated by reference numeral 224 are combined schematically for illustration, but that the antenna and receiver may be separately located components, and that the antenna may be a GPS patch antenna or helical antenna for example.

It will, of course, be understood by one of ordinary skill in the art that the electronic components shown in FIG. 3 are powered by one or more power sources (not shown) in a conventional manner. Such power sources may include an internal battery and/or a input for a low voltage DC supply or any other suitable arrangement. As will be understood by one of ordinary skill in the art, different configurations of the components shown in FIG. 3 are contemplated. For example, the components shown in FIG. 3 may be in communication with one another via wired and/or wireless connections and the like. Thus, the navigation device 200 described herein can be a portable or handheld navigation device 200.

In addition, the portable or handheld navigation device 200 of FIG. 3 can be connected or "docked" in a known manner to a vehicle such as a bicycle, a motorbike, a car or a boat for example. Such a navigation device 200 is then removable from the docked location for portable or handheld navigation use. Indeed, in other embodiments, the device 200 may be arranged to be handheld to allow for navigation of a user.

Figure 4:
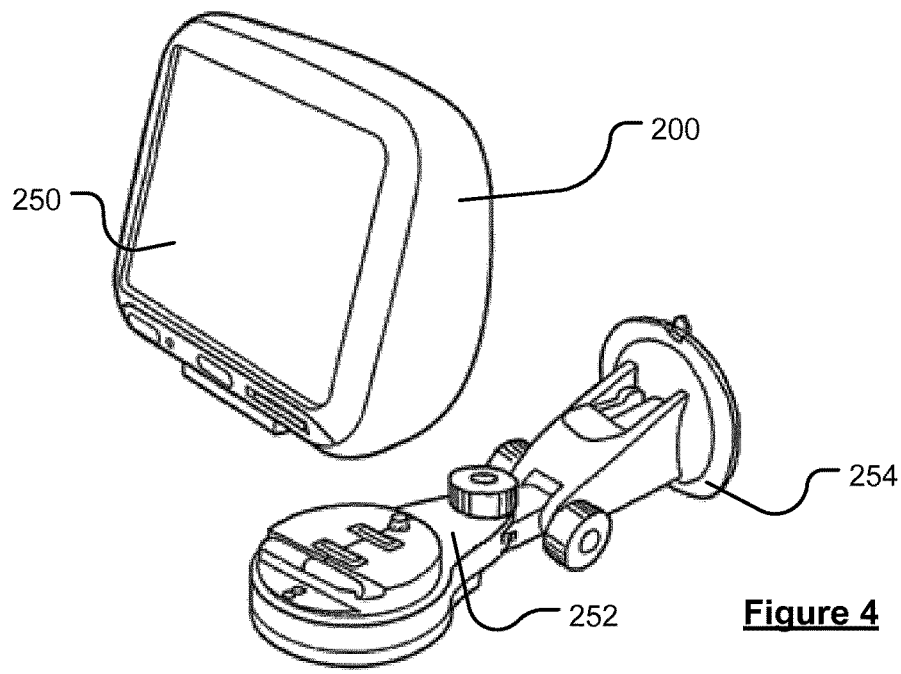
FIG. 4 is a schematic diagram of an arrangement of mounting and/or docking a navigation device.

Referring to FIG. 4, the navigation device 200 may be a unit that includes the integrated input and display device 206 and the other components of FIG. 2 (including, but not limited to, the internal GPS receiver 224, the processor 202, a power supply (not shown), memory systems 214, etc.).

The navigation device 200 may sit on an arm 252, which itself may be secured to a vehicle dashboard/window/etc. using a suction cup 254. This arm 252 is one example of a docking station to which the navigation device 200 can be docked. The navigation device 200 can be docked or otherwise connected to the arm 252 of the docking station by snap connecting the navigation device 200 to the arm 252 for example. The navigation device 200 may then be rotatable on the arm 252. To release the connection between the navigation device 200 and the docking station, a button (not shown) on the navigation device 200 may be pressed, for example. Other equally suitable arrangements for coupling and decoupling the navigation device 200 to a docking station are well known to persons of ordinary skill in the art.

The processor 202 and memory 214 cooperate to support a BIOS (Basic Input/Output System) that functions as an interface between functional hardware components 280 of the navigation device 200 and the software executed by the device. The processor 202 then loads an operating system from the memory 214, which provides an environment in which application software (implementing some or all of the described route planning and navigation functionality) can run. The application software provides an operational environment including the Graphical User Interface (GUI) that supports core functions of the navigation device, for example map viewing, route planning, navigation functions and any other functions associated therewith. In this respect, part of the application software comprises a view generation module.

In the embodiment being described, the processor 202 of the navigation device is programmed to receive GPS data received by the antenna 224 and, from time to time, to store that GPS data, together with a time stamp of when the GPS data was received, within the memory 214 to build up a record of the location of the navigation device. Each data record so-stored may be thought of as a GPS fix; i.e. it is a fix of the location of the navigation device and comprises a latitude, a longitude, a time stamp and an accuracy report.

In one embodiment the data is stored substantially on a periodic basis which is for example every 5 seconds. The skilled person will appreciate that other periods would be possible and that there is a balance between data resolution and memory capacity; i.e. as the resolution of the data is increased by taking more samples, more memory is required to hold the data. However, in other embodiments, the resolution might be substantially every: 1 second, 10 seconds, 15 seconds, 20 seconds, 30 seconds, 45 seconds, 1 minute, 2.5 minutes (or indeed, any period in between these periods). Thus, within the memory of the device there is built up a record of the whereabouts of the device 200 at points in time. In some embodiments, it may be found that the quality of the captured data reduces as the period increases and whilst the degree of degradation will at least in part be dependent upon the speed at which the navigation device 200 was moving a period of roughly 15 seconds may provide a suitable upper limit.

Whilst the navigation device 200 is generally arranged to build up a record of its whereabouts, some embodiments, do not record data for a predetermined period and/or distance at the start or end of a journey. Such an arrangement helps to protect the privacy of the user of the navigation device 200 since it is likely to protect the location of his/her home and other frequented destinations. For example, the navigation device 200 may be arranged not to store data for roughly the first 5 minutes of a journey and/or for roughly the first mile of a journey.

In other embodiments, the GPS may not be stored on a periodic basis but may be stored within the memory when a predetermined event occurs. For example, the processor 202 may be programmed to store the GPS data when the device passes a road junction, a change of road segment, or other such event.

Further, the processor 202 is arranged, from time to time, to upload the record of the whereabouts of the device 200 (i.e. the GPS data and the time stamp) to the server 150. In some embodiments in which the navigation device 200 has a permanent, or at least generally present, communication channel 152 connecting it to the server 150 the uploading of the data occurs on a periodic basis which may for example be once every 24 hours. The skilled person will appreciate that other periods are possible and may be substantially any of the following periods: 15 minutes, 30 minutes, hourly, every 2 hours, every 5 hours, every 12 hours, every 2 days, weekly, or any time in between these. Indeed, in such embodiments the processor 202 may be arranged to upload the record of the whereabouts on a substantially real time basis, although this may inevitably mean that data is in fact transmitted from time to time with a relatively short period between the transmissions and as such may be more correctly thought of as being pseudo real time. In such pseudo real time embodiments, the navigation device may be arranged to buffer the GPS fixes within the memory 214 and/or on a card inserted in the port 228 and to transmit these when a predetermined number have been stored. This predetermined number may be on the order of 20, 36, 100, 200 or any number in between. The skilled person will appreciate that the predetermined number is in part governed by the size of the memory 214 or card within the port 228.

In other embodiments, which do not have a generally present communication channel 152 the processor 202 may be arranged to upload the record to the server 152 when a communication channel 152 is created. This may for example, be when the navigation device 200 is connected to a user's computer. Again, in such embodiments, the navigation device may be arranged to buffer the GPS fixes within the memory 214 or on a card inserted in the port 228. Should the memory 214 or card inserted in the port 228 become full of GPS fixes the navigation device may be arranged to delete the oldest GPS fixes and as such it may be thought of as a First in First Out (FIFO) buffer.

In the embodiment being described, the record of the whereabouts comprises one or more traces with each trace representing the movement of that navigation device 200 within a 24 hour period. Each 24 is arranged to coincide with a calendar day but in other embodiments, this need not be the case.

Generally, a user of a navigation device 200 gives his/her consent for the record of the devices whereabouts to be uploaded to the server 150. If no consent is given then no record is uploaded to the server 150. The navigation device itself, and/or a computer to which the navigation device is connected may be arranged to ask the user for his/her consent to such use of the record of whereabouts.

The server 150 is arranged to receive the record of the whereabouts of the device and to store this within the mass data storage 160 for processing. Thus, as time passes the mass data storage 160 accumulates a plurality of records of the whereabouts of navigation devices 200 which have uploaded data.

As discussed above, the mass data storage 160 also contains map data. Such map data provides information about the location of road segments, points of interest and other such information that is generally found on map.

Embodiments of the invention will now be described by reference to FIGS. 5 to 12.

The embodiments of the invention are carried out in relation to electronic map data comprising a plurality of segments indicative of segments of a navigable network, e.g. a road network. The segments are connected by nodes. The methods are described as being performed by a portable navigation device (PND_ associated with a vehicle of a user. However, it will be appreciated that other forms of navigation device may be used, e.g. an integrated in-vehicle device. Furthermore, the navigation device may be any mobile device having navigation functionality. In other embodiments, it is envisaged that at least some of the steps may be performed by a server, such that the method may be carried out by a server, alone, or in combination with a navigation device, e.g. PND.

Figure 5:
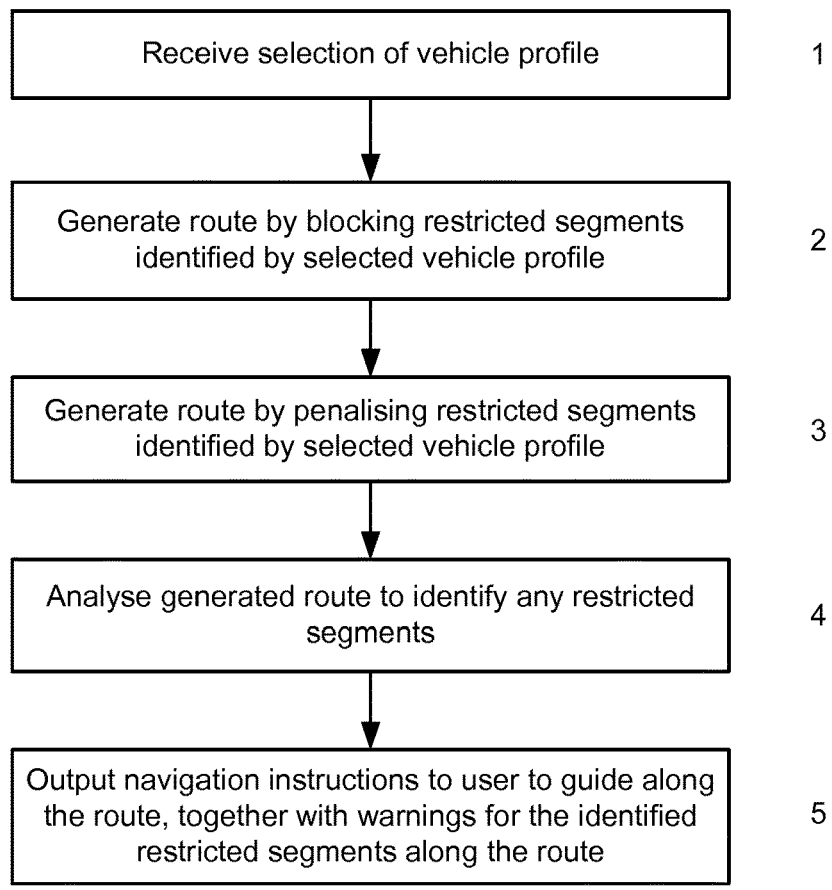
FIG. 5 illustrates a method for generating a route according to a selected vehicle profile according to an embodiment of the invention.
Figure 6:
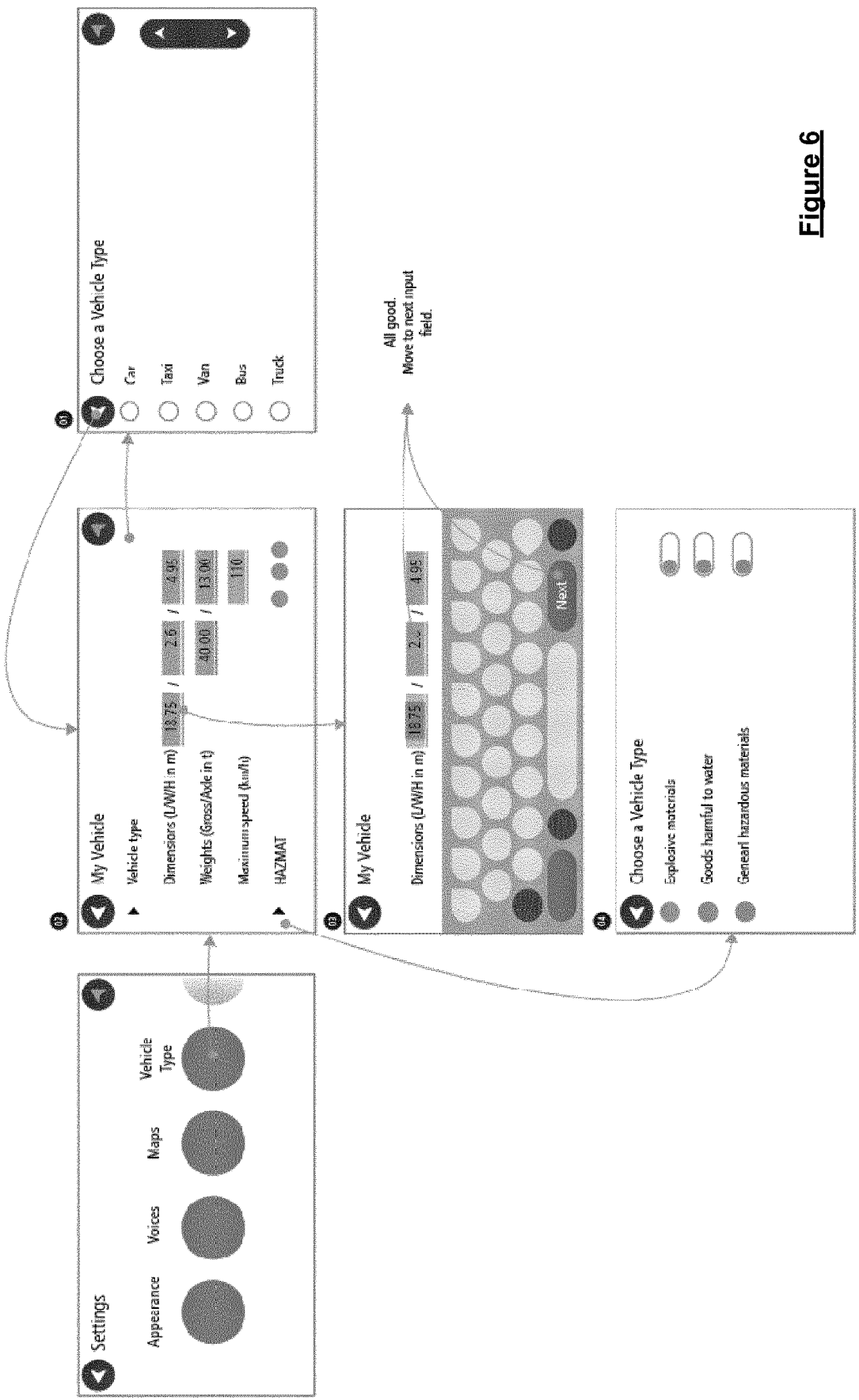
FIG. 6 illustrates an exemplary user interface to allow a user to create a vehicle profile.
Figure 7:
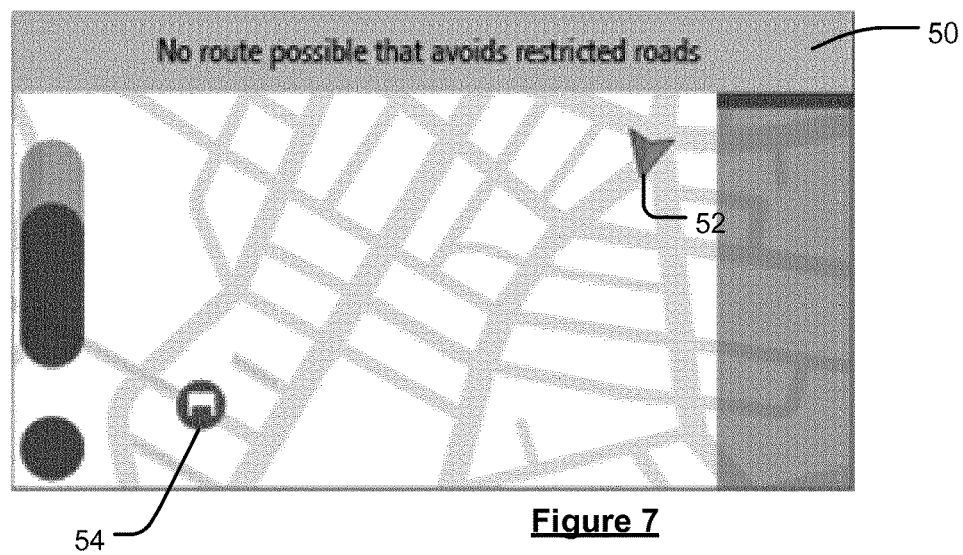
FIGS. 7 to 12 illustrate exemplary displays which may be output to the user at different stages in the method of FIG. 6.

Referring to FIG. 5, in accordance with step 1, the selection of a vehicle profile is received. The vehicle profile can be selected by a user, for example, using the method illustrated in FIG. 6. In FIG. 6, the user selects the menu item "vehicle type", e.g. through an interaction with a touch screen, a button press, a voice instructions, etc, and is presented with a screen called "My Vehicle" that can be used to create a vehicle profile. As can be seen, the profile comprises five sections: vehicle type; dimensions of the vehicle (length, width and height); weight of the vehicle (gross and axle); maximum speed of the vehicle and whether the vehicle is carrying hazardous materials (HAZMAT). In the example depicted, the vehicle type can be one of: car; taxi; van; bus; and truck; although these choices are merely exemplary and embodiments of the invention can include fewer or more choices as desired.

Following the creation of a vehicle profile by a user, or the selection of a predetermined vehicle profile by a user (i.e. since the vehicle profile could have been previously created), the information contained in the profile can be used to identify segments of the electronic map that should be restricted for the vehicle in question. For example, the segment may represent navigable elements of the road network that are one of: too narrow for the width of the vehicle; contain a bridge that is too low for the height of the vehicle; include a bend that is too sharp; include an incline that is too steep; are prohibited for vehicles of a certain type; are prohibited for vehicles of a certain gross and/or axle weight; and prohibited for vehicles carrying certain hazardous loads. As will be appreciated, some of these restrictions are physical in nature, i.e. the vehicle is prevented from traversing a road due to a conflict between a size or other physical property of the vehicle and the road itself (e.g. low bridges, etc), while others of the restrictions are legal in nature, i.e. the vehicle is prevented from traversing a road due to a requirement set by the relevant country, region and/or city's government. The restricted segments of the electronic map will typically be identified by comparing the information provided by the vehicle profile to attributes associated with the segments stored in the electronic map, or in a side file thereof.

In accordance with step 2 of FIG. 5, an attempt is made to generate a route between an origin, such as the vehicle's current position, and a destination, e.g. one that has been selected by the user, that completely avoids any restricted segments. This is achieved by using a routing algorithm that is blocked from exploring segments of the electronic map. The routing algorithm can be of any form as desired, but will typically involve determining a cost of traversing a segment using a cost function, which may have been selected by the user, and exploring routes comprising a plurality of segments to determine a minimum cost (or optimal) route between the origin and destination. The cost function may be selected by the user, so as to determine, for example, a fastest route, a shortest route, a most fuel efficient route, etc.

By blocking certain segments of the electronic map, however, it is possible that no route can be determined between the origin and the destination. In other words, due to the selected vehicle profile, it is possible that no route can be generated that avoids all restricted segments according to the information in the profile. When such an event occurs, a screen such as that depicted in FIG. 7 can be shown to the user. The screen includes an icon 52 indicating the current position of the vehicle and an icon 54 indicating the destination; both superimposed on a representation of the road network generated from the electronic map. The screen also includes a notification 50 that reads "No route possible that avoids restricted roads".

In accordance with step 3 of FIG. 5, when no route can be generated, the routing algorithm is modified such that the segments identified by the selected vehicle profile are penalised, instead of being blocked. A route generated by such a routing algorithm attempts to avoid using restricted segments, but will do so if it is not possible to find a route between the origin and destination that doesn't one or more of such restricted segments. The routing algorithm can be of any form as desired, but will again typically involve determining a cost of traversing a segment using a cost function, which may have been selected by the user, and exploring routes comprising a plurality of segments to determine a minimum cost (or optimal) route between the origin and destination. The routing algorithm is however arranged to apply a cost penalty to those segments that are identified in the selected vehicle profile, such that the cost for traversing the segment will be higher (making it less favourable for inclusion in a route) than it would be if the segment had not been identified in the profile.

The goal of the cost function used in step 3 of FIG. 5, i.e. to determine a fastest route, a shortest route, a most fuel efficient route, etc, will typically be the same goal as that used in the step 2 of FIG. 5.

In embodiments, step 3 may involve performing a first "fallback" routing operation, and if that fails, then performing a second "fallback" routing operation. In particular, as discussed above, the vehicle profile may identify a first set of segments that are restricted for legal reasons, and a second set of segments that are restricted for physical reasons. In the first fallback solution, the cost function used in the routing operation penalises the first set of segments, while continuing to block the second set of segments. A route that includes some legally restricted portions being seen as being more preferably that a route that includes physically restricted portions. Occasionally, even this first fallback solution does not result in a route, and, in such situations, the second fallback solution. In the second fallback solution, the cost function used in the routing operation penalises both the first set of segments and the second set of segments. The degree of penalisation may be different, however, with the first set of segments being penalised less than the second set of segments.

In step 4 of FIG. 5, the route that is generated between the origin and the destination is analysed to determine any segments in the route that are identified as being restricted in the selected vehicle profile. The generated route and data identifying the determined segments is then passed to an output device for provision to a user—see step 5 of FIG. 5.

Figure 8:
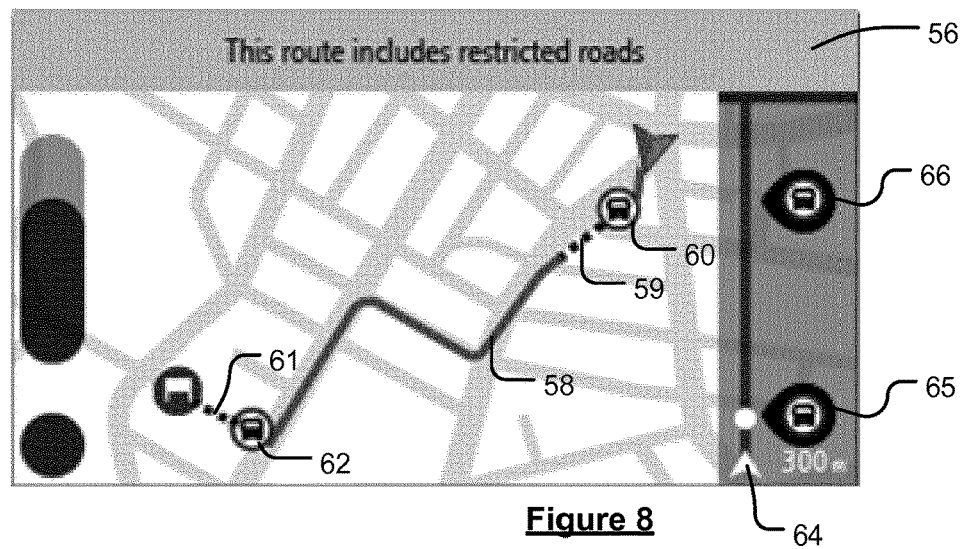

For example, a screen such as that depicted in FIG. 8 can be shown to the user, e.g. for use when navigating (or being guided) along the route. The screen includes a notification 56 that reads "This route includes restricted roads", such that user is aware the route includes some portions that were identified as being restricted in accordance with the selected vehicle profile. The screen includes an icon indicating the current position of the vehicle, an icon indicating the destination and a line 58 representing the generated route; all superimposed on a representation of the road network generated from the electronic map. As can be seen, the route 58 is mainly shown as a solid line, but also includes two portions 59 and 61 shown as dotted lines. These dotted lines represent portions of the route that are associated with restricted segments. Also associated with these dotted portions is an icon—60 for portion 59, and 62 for portion 61—that identifies the reason why the portion is restricted. In this instance, both portions are identified as being prohibited for traversal by a vehicle of the type selected in the profile. The screen also identifies a linear representation of the route, or a portion thereof, on a right hand side of the screen. Although it will be appreciated that the placement of this linear representation is merely exemplary, and it can be positioned in any section of the screen as desired. The linear representation extends from the current position 64 to a predetermined distance along the route, or to the destination, and depicts icons 65 and 66 showing the relative location of the restricted segments along the route. As will be appreciated, icon 65 relates to segment 59, and is currently 300 m in front of the current position.

In some embodiments, when the current position comes within a predetermined distance of the restricted segment, the display (in this case the linear representation) may zoom in on the restricted segment, and provide some additional details regarding the restricted segment. This is shown, for example, in FIG. 10, where the current position of the position vehicle is shown as 270 m from a low bridge having a height of 2.5 m.

Figure 9:
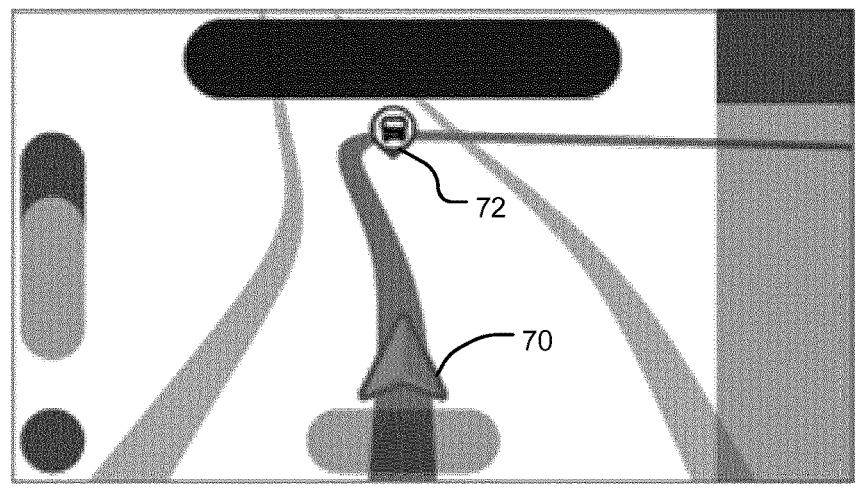
Figure 10:
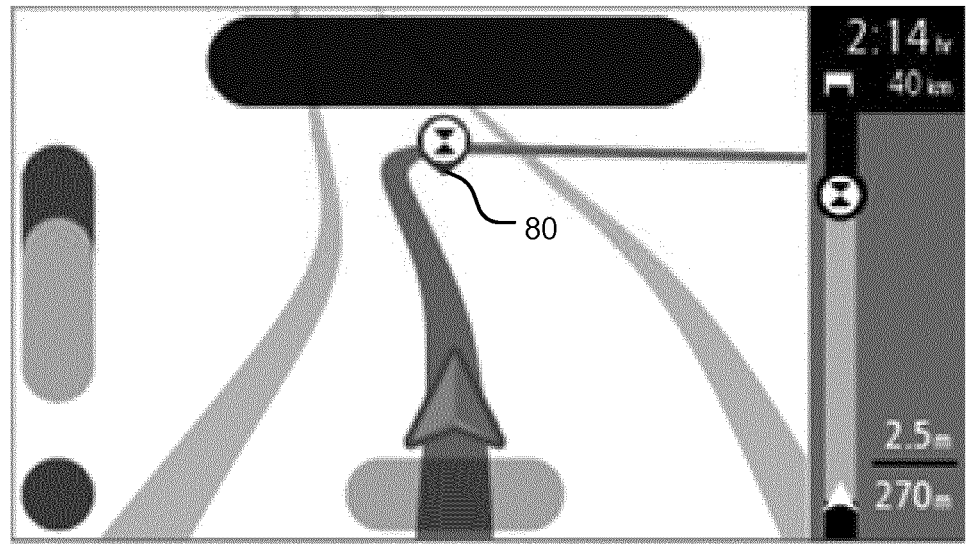
Figure 11:
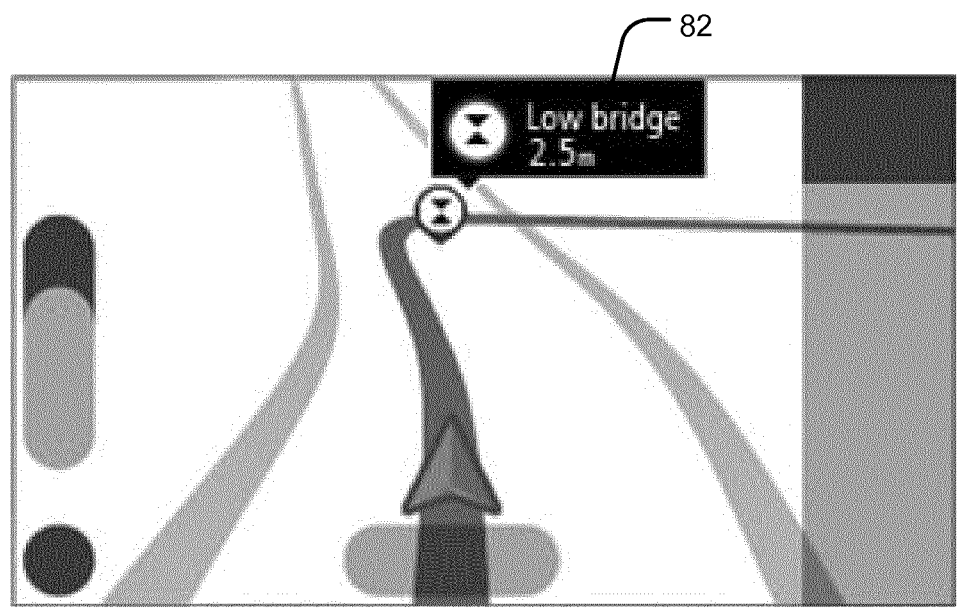

While FIG. 8 shows an exemplary two dimensional (2D) navigation screen, FIG. 9 shows an exemplary three dimensional (3D) navigation screen. The 3D navigation screen shows the current position of the vehicle and an icon 72 showing the location of a restricted segment on the planned route currently being travelled. As shown in FIG. 11, a user can selected the icon 72 to provide additional information (see box 82) about the associated restricted segment. For example, in FIG. 11, the restricted is a low bridge having a height of 2.5 m.

Figure 12:
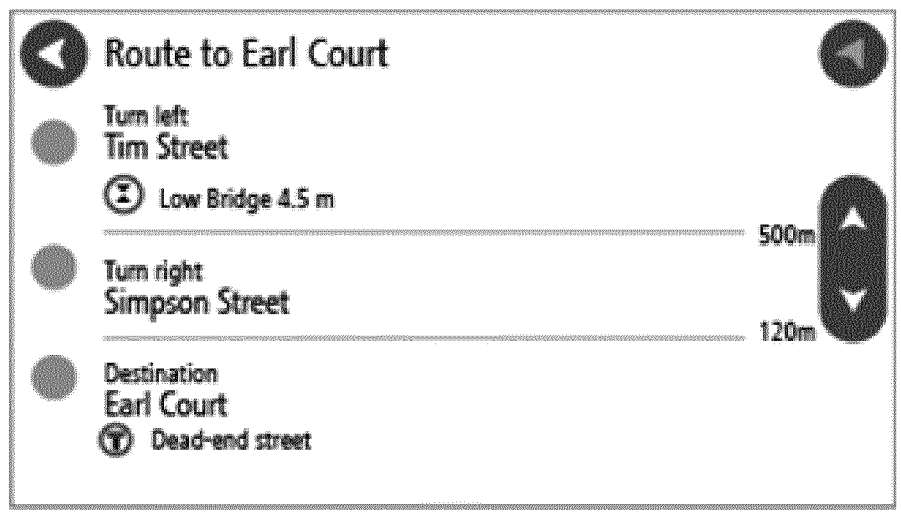

FIG. 12 shows another way of showing warnings about restricted segments to a user. In this case, a summary of the planned route is shown to the user: turn left on to Tim Street; turn right onto Simpson Street; and the destination is Earl Court. The user is warned that Tim Street includes a low bridge having a height of 4.5 m, and the destination is a dead-end street.

Thus, in accordance with embodiments of the invention as depicted in FIGS. 8 to 12, a user is provided with information about a planned route, e.g. so as to be guided along the route, together with warning information about any restricted segments that are present along the route; the restricted segments having been identified according to the selected vehicle profile.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

Although the preferred method has been described in relation to the selected profile being a vehicle profile, and which identifies segments that are restricted according to the vehicle type, vehicle dimensions, etc, it will be appreciated that the profile can be any profile that identifies one or more segments of the electronic map that should be avoided if possible. For example, a user may create a profile identifying certain portions of the navigable network on which they do not wish to travel if possible, and the profile lists the segments of the electronic map that are equivalent to the identified portions of the network.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method of generating a route in an area covered by an electronic map, the map comprising a plurality of segments representing navigable elements of a navigable network in the area covered by the electronic map, the method comprising:
   receiving a selection of a profile, the profile comprising data identifying one or more segments of the electronic map;
   attempting to generate a first route between an origin and a destination in the electronic map using a first routing process in which each of the one or more segments identified by the selected profile is identified as blocked within routes, the attempting failing due to a presence of segments in potential first routes that are identified as blocked;

in response to the attempt to generate the first route failing, generating a second route between the origin and the destination using a second routing process in which each of the one or more segments identified by the selected profile is penalised via application of a cost penalty;

detecting any given segments in the second route that are segments identified by the selected profile; and outputting data representative of the second route and the given segments.

2. The method of claim 1, wherein:
the profile is a vehicle profile identifying at least one property of a vehicle; and
the one or more segments of the electronic map are segments representative of navigable elements that are less desirable for traversal by vehicles having the at least one property.

3. The method of claim 2, wherein the at least one property of the vehicle comprises one or more of: a vehicle type; at least one dimension of the vehicle; at least one weight of the vehicle; and information identifying any hazardous materials carried by the vehicle.

4. The method of claim 1, wherein the second routing process comprises:
using a route planning algorithm that assigns a cost for traversing segments of the electronic map and explores routes between the origin and the destination comprising a plurality of segments to identify a minimum cost route,
wherein the second route is a minimum cost route between the origin and the destination, and
wherein each of the one or more segments identified by the selected profile is penalised through the application of a cost penalty, such that each of the one or more segments identified by the selected profile is less favorable for inclusion in the minimum cost route.

5. The method of claim 4, wherein:
each of the segments of the electronic map is associated with attribute data representative of one or more attributes associated with the respective, segment; and
the cost of traversing each segment is determined using a cost function and based at least in part on the attribute data associated with the segment relevant for the selected profile.

6. The method of claim 5, wherein the cost of traversing each of the one or more segments identified by the selected profile comprises a first component based on the attribute data associated with the segment and a second component comprising an applied cost penalty.

7. The method of claim 1, wherein the generation of the second route occurs responsive to receipt of an input from a user confirming acceptance of a route that includes one or more segments identified by the selected profile.

8. The method of claim 1, comprising displaying at least a portion of the second route to the user on a display device, the displaying including displaying portions of the second route representative of the given segments in a different manner than other portions of the second route.

9. The method of claim 1, comprising providing a set of navigation instructions for guiding a user along the second route, the navigation instructions identifying the given segments.

10. The method of claim 9, wherein the navigation instructions provide a reason that each of the given segments was identified in the profile.

11. A system for generating a route in an area covered by an electronic map, the map comprising a plurality of segments representing navigable elements of a navigable network in the area covered by the electronic map, the system comprising a processing resource, the processing resource being configured to:
receive a selection of a profile, the profile comprising data identifying one or more segments of the electronic map;
attempting to generate a first route between an origin and a destination in the electronic map using a first routing process in which each of the one or more segments identified by the selected profile is identified as blocked within routes, the attempting failing due to a presence of segments in potential first routes that are identified as blocked;
in response to the attempt to generate the first route failing, generate a second route between the origin and the destination using a second routing process in which each of the one or more segments identified by the selected profile is penalised via application of a cost penalty;
detect any given segments in the second route that are segments identified by the selected profile; and
output data representative of the second route and the generated segments.

12. The system of claim 11, wherein the system is a navigation device.

13. The system of claim 11, wherein the system is a server.

14. The system of claim 11, wherein the system is a mobile device.

15. A non-transitory computer readable medium having stored therein a computer program product comprising instructions which, when read by a computing device, cause the computing device to generate a route in an area covered by an electronic map using a method, the method comprising:
receiving a selection of a profile, the profile comprising data identifying one or more segments of the electronic map;
generating a first route between an origin and a destination in the electronic map using a first routing process in which each of the one or more segments identified by the selected profile is identified as blocked within routes, the attempting failing due to a presence of segments in potential first routes that are identified as blocked;
in response to the attempt to generate the first route failing, generating a second route between the origin and the destination using a second routing process in which each of the one or more segments identified by the selected profile is penalised through the application of a cost penalty;
detecting any given segments in the second route that are segments identified by the selected profile; and
outputting data representative of the second route and the given segments.

16. The non-transitory computer readable medium of claim 15, wherein the computing device is a navigation device or a server.

* * * * *